C. F. HAUNZ.
BATTERY ELEMENT.
APPLICATION FILED AUG. 2, 1919.
1,363,729.
Patented Dec. 28, 1920.
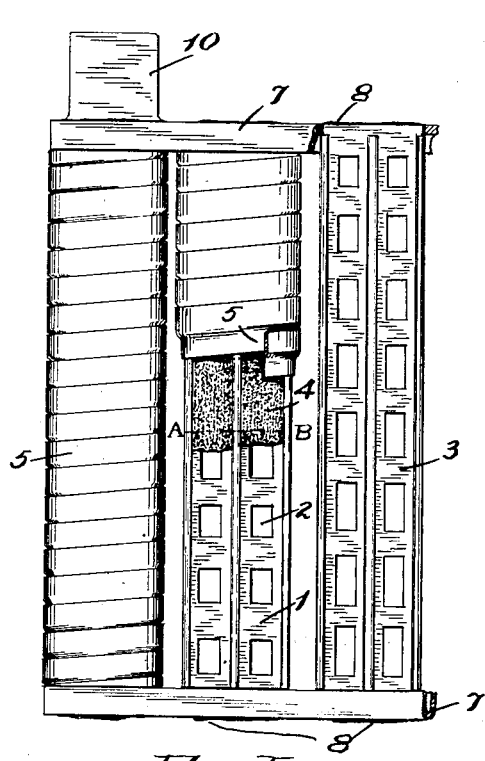
Fig. I.
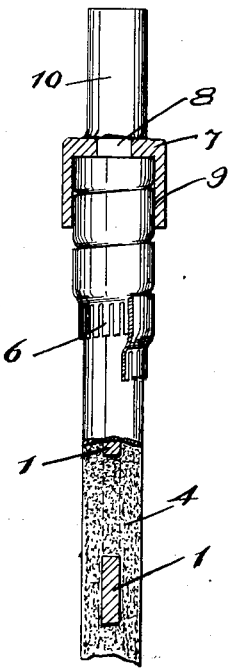
Fig. II.
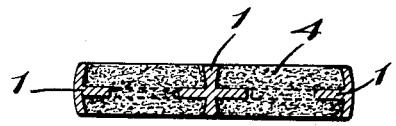
Fig. III.
INVENTOR,
Charles F. Haunz.
BY
Kenyon & Kenyon,
his ATTORNEYS

UNITED STATES PATENT OFFICE.

CHARLES F. HAUNZ, OF LANCASTER, NEW YORK, ASSIGNOR TO GOULD STORAGE BATTERY COMPANY, A CORPORATION OF NEW YORK.

BATTERY ELEMENT.

1,363,729.  Specification of Letters Patent.  Patented Dec. 28, 1920.

Application filed August 2, 1919. Serial No. 314,916.

*To all whom it may concern:*

Be it known that I, CHARLES F. HAUNZ, a citizen of Germany, residing at 45 Lombardy street, Lancaster, county of Erie, and State of New York, whose post-office address is care of Gould Storage Battery Company, Depew, N. Y., have invented certain new and useful Improvements in Battery Elements, of which the following is a specification.

My invention pertains to that class of devices known as battery elements such as used in either primary or secondary batteries.

An object of my invention is to provide an element of rugged construction which may be readily and cheaply manufactured and which may be both efficient and capable of withstanding operation at high rates of charge or discharge.

Figure I is a partial side elevation and partial section of a portion of an element or plate such as may be used in storage batteries made up in such manner as to comprehend my invention;

Fig. II is a partial section and partial end elevation of a portion of a plate similar to that shown in Fig. I; and Fig. III is a section of a portion of one of the electrodes composing the plate in Fig. I, taken on the line A—B.

In practice, I build up the elements or plates to be used in a cell of a suitable number of my improved electrodes, which in the ordinary commercial size of plate may be the full length of the plate, if desired, and assembled together in sufficient number to provide a plate of proper width. The electrodes comprise a supporting member or grid which carries the active material or material adapted to become active, and together with the same are surrounded by an overlapping insulating material between the layers of which the electrolyte may pass and come into contact with the active material. My improved electrodes may be formed in units having a considerable length and then cut to the proper length to suit the particular type of battery element or plate to be made. And, if this method is to be followed, I prefer that the supporting device or grid shall be of a uniform construction so that it may be cut in suitable lengths and be of the same form throughout the length. And I prefer to use a grid or support of light webbed section provided with stiffening ribs which also serve to assist in holding the active material in place. I prefer to perforate the webs so that active material or material to become active, in paste form, may be forced through the openings in such manner as to form a solid mass upon each side of the web, united through the perforations, such a grid or webbed construction of support is shown in elevation at 1 in Fig. I, and in section in Figs. II and III. And it will be noted that the perforations 2 are all of substantially the same size or sufficiently near so that various lengths of electrodes may be cut from a long strip and be of substantially homogeneous construction throughout.

If it be desired to make up the electrodes especially for use in particular lengths of plate, I prefer to make the support of some construction as indicated at 3 in Fig. I, wherein the perforations are shown as increasing in size from the top of the plate toward the bottom, as such a construction allows the use of more active material and the portions of the same which pass through the openings in the grid will be stronger as the openings increase in size, and less apt to fracture.

In this manner I can also so proportion the grid that the current density will remain substantially uniform throughout the material of the grid by lessening the amount of material in the grid as the distance increases from the electrical connection at the top of the plate.

In practice, the material to become active is applied in the form of paste and worked into the grids or supports, as shown in elevation at 4 in Fig. I and in vertical section in Fig. II and in horizontal section in Fig. III. And it will be obvious that by shaping the supports or grids in the manner indicated in the section shown in Fig. III, the grid will tend to hold the active material in place. The material to become active may be allowed to dry, or, if desired, it may first be "formed" and then wrapped with an insulating tape or cover, preferably of narrow continuous strips of thin insulating material having an offset when viewed in section, or so wrapped and stretched as to produce an offset at the overlapping edges, as indicated at 5 in Fig. I, wherein a portion is broken away to show more clearly the offset in the insulation which is wrapped throughout the entire length of the electrode in the manner indicated in the complete left-hand electrode of Fig. I. If desired to obtain more freedom of circulation of electrolyte than is permitted by the use of the tape 5, as shown in Fig. I, the portion of the tape or winding which is covered by the overlap may be slotted, cut away, or shaped in any suitable manner, as indicated at 6 in Fig. II.

The electrodes are assembled to form a plate by mounting a suitable number in conducting top and bottom members 7 of substantially channel or U-shaped section, perforated to receive the ends of the supports or grids, as indicated at 8 in Figs. I and II. The portions of the grids in said perforations are preferably burned or otherwise united to the conducting members 7, and the tape or insulating material is held in place at the ends of the electrodes by the overlapping portions of the members 7, as indicated plainly at 9 in Fig. II. The upper member 7 is provided with any suitable kind of lug 10, or other instrumentality, for providing electrical connection with the plates.

It will be noted that with my improved elements placed in an electrolyte, the same may freely reach the active material by passing between the various convolutions or overlapping portions of the insulating material 5; that is to say, the outer part of one convolution is so spread apart from the inner part of the next convolution above, that the electrolyte may pass down through a passage between them from the outside to the active material, while the part of the convolutions of smaller diameter fit relatively snugly against the active material, so that this insulating means not only prevents the active material from falling away, but also this insulating material will prevent the electrodes from coming in contact with any portions of neighboring plates and effectively insulate the elements from each other, and should small particles of active material become detached from the electrodes, they will not be deposited as sediment in the bottom of the receptacle or battery jar but will be retained and held in contact with the active material through the instrumentality of the insulation 5. And these particles while so held will not make toward injuring the cell as they do if allowed to fall away from the electrodes; but, by being held in intimate contact with the active material attached to the grid, will lend their part toward increasing the amount of available active material, and, therefore, increase the capacity of the plate.

From the foregoing, it will be obvious that I have produced a battery element which may be readily constructed and which will at all times be insulated from contact with neighboring elements, as is desired particularly in storage batteries; and that owing to the fact that the active material is held in its proper position upon the grids, by means of the insulating material, high rates of charging and discharging may be employed without the danger of disintegration of the active material or shedding of the same.

While my invention has been described with reference to lead storage batteries, it is in no way limited in use to that type of battery. When so used, the electrolyte is usually dilute sulfuric acid. And, for use in this electrolyte, I find rubber a very suitable material for the insulation 5. But other materials, of course, might be required if used in other solutions. When rubber is employed it may be either partially or wholly vulcanized with the desired off-set section, or it may be wound upon the electrodes while soft, and stretched to produce the desired off-set, and then vulcanized in place, as may be found most desirable.

I do not wish in any way to limit myself to any of the exact constructions shown in the drawing and described in the specification, as the said constructions are described merely to illustrate a use of my invention, while wide departure in the way of details of construction and assemblage may be made without departing from the spirit and scope of my invention, which is as set forth in the following claims.

What I claim as new and desire to secure by Letters Patent is:

1. A battery element comprehending a support, active material carried thereby and an overlapped winding surrounding said material and support.

2. A battery element comprising a support of conducting material, active material carried thereby in intimate contact therewith and a sheath surrounding the same adjacent the active material, said sheath being provided with passages therethrough extending downwardly from the outside to the inside, whereby the electrolyte is permitted to pass therethrough but active material is prevented from falling away.

3. A battery element comprising a support of conducting material, active material carried thereby in intimate contact therewith and a sheath of acid resisting insulating material surrounding the same, said sheath being provided with passages therethrough whereby the electrolyte is permitted to pass therethrough but active material is prevented from falling away.

4. A battery element comprehending a support of conducting material, active material in intimate contact therewith, and an overlapping impervious winding for retaining said material in place.

5. A battery element comprehending a support of conducting material, active material in intimate contact therewith, and an overlapping insulating winding for retaining said material in place.

6. A battery element comprehending a support of conducting material, active materail in intimate contact therewith, and an overlapping impervious insulating winding for retaining said material in place.

7. A battery element comprehending a support, active material in contact therewith, an overlapped insulating winding about said element arranged to retain the active material in place and permit passage of an electrolyte between the lapped portions thereof.

—8. A battery element comprehending a support, active material in contact therewith, an overlapped imperforate winding about said element arranged to retain the active material in place and permit passage of an electrolyte between the lapped portions thereof.

9. A battery element comprising a support of conducting material, active material carried thereby in intimate contact therewith and a rubber sheath surrounding the same, said sheath being provided with passages therethrough whereby the electrolyte is permitted to pass therethrough but active material is prevented from falling away.

10. A battery element comprehending active material provided with an overlapped insulating material arranged to provide a series of overlapping edges permitting the passage of an electrolyte.

11. A battery element comprehending a support, active material in intimate contact therewith, said support being formed to retain said active material, and an insulating cover surrounding the active material and support and providing a series of overlapped portions between which an electrolyte may reach the active material.

12. A battery element comprehending active material surrounded by a winding of insulating material having an offset therein whereby a portion of each convolution of the insulating material is in contact with the active material, and a portion overlaps the next convolution of the insulating material which itself is in contact with the active material, said offset providing space for liquid circulation between the overlaps.

13. A battery element comprehending active material provided with a covering of overlapping insulating material, the insulating material at the laps being formed to allow a free passage of electrolyte to the active material.

14. A battery element comprising a support of conducting material, active material carried thereby in intimate contact therewith and a rubber sheath surrounding the same adjacent the active material, and serving to retain the active material in place, said sheath being provided with passages therethrough extending downwardly from the outside to the inside, whereby the electrolyte is permitted to pass therethrough but active material is prevented from falling away.

15. A battery element comprising a body of active material and a sheath of acid resisting insulating material surrounding the same, said sheath being provided with passages therethrough extending downwardly from the outside to the inside, whereby the electrolyte is permitted to pass therethrough but active material is prevented from falling away.

In testimony whereof, I have signed my name to this specification.

CHARLES F. HAUNZ.